United States Patent [19]

Wilson

[11] 4,361,983

[45] Dec. 7, 1982

[54] WATER AND FERTILIZER DISPENSER FOR PLANTS

[76] Inventor: Gary M. Wilson, 1028 Shaddelee La., Ft. Myers, Fla. 33907

[21] Appl. No.: 205,923

[22] Filed: Nov. 12, 1980

[51] Int. Cl.³ .............................................. A01G 9/10
[52] U.S. Cl. ........................................... 47/48.5; 47/9
[58] Field of Search ........................ 47/25, 48.5, 9, 47

[56] References Cited

U.S. PATENT DOCUMENTS

| | | | |
|---|---|---|---|
| 718,380 | 1/1903 | Patterson | 47/48.5 |
| 2,145,934 | 2/1939 | Kingman | 47/48.5 X |
| 2,791,347 | 5/1957 | Boehm | 47/48.5 X |
| 3,005,287 | 10/1961 | Dudley | 47/48.5 X |
| 3,821,863 | 7/1974 | Chan | 47/48.5 |
| 3,914,900 | 10/1975 | Bigelow et al. | 47/9 |
| 4,051,628 | 10/1977 | Knapp | 47/48.5 |

Primary Examiner—Robert E. Bagwill
Attorney, Agent, or Firm—Eugene F. Malin

[57] ABSTRACT

A subterranean, visually unobserveable, landscaping device for watering and fertilizing plant, tree, and shrub roots. The device is especially useful with weed inhibiting ground covers placed around the plant growth.

A special compartment inhibits weed growth by laterally surrounding the hole in a ground cover and stores fertilizer that is dispensed incrementally over a period of time through interaction with water flow through the device.

2 Claims, 6 Drawing Figures

U.S. Patent     Dec. 7, 1982     4,361,983
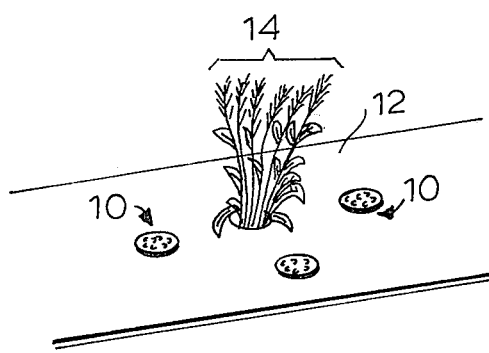
FIG.1
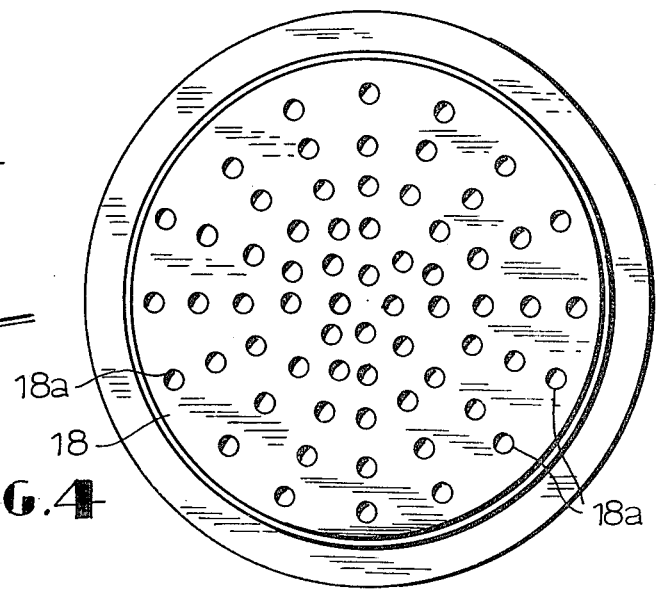
FIG.4
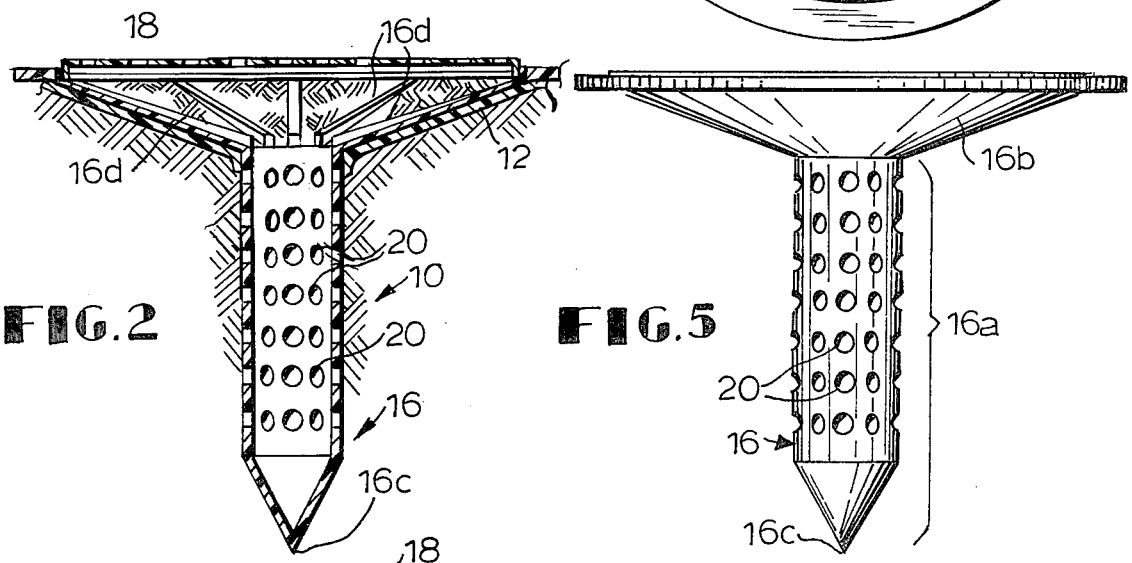
FIG.2
FIG.5
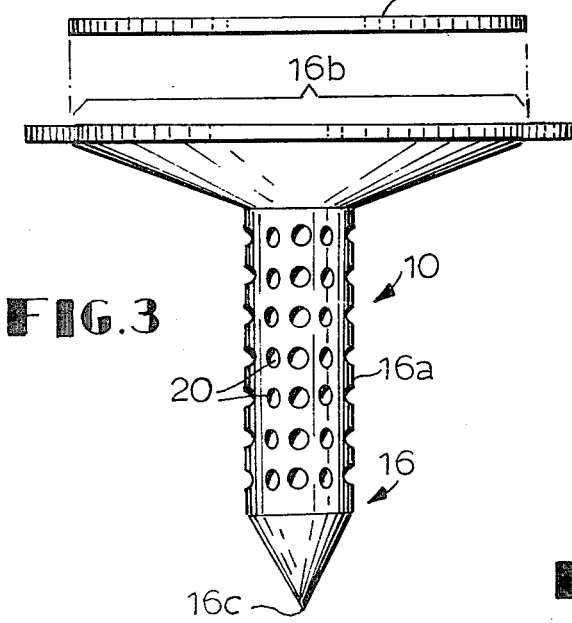
FIG.3
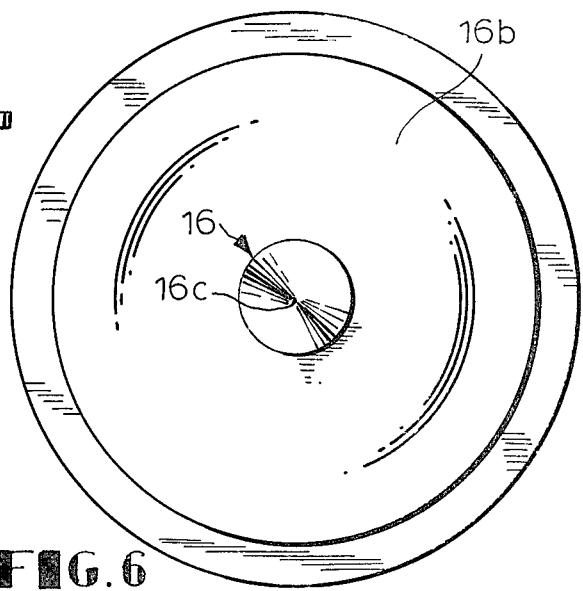
FIG.6

WATER AND FERTILIZER DISPENSER FOR PLANTS

BACKGROUND OF THE INVENTION

This invention relates generally to a dispenser used with a weed inhibiting ground cover that is mounted in a subterranean environment adjacent the roots of plants, trees, or shrubs to provide for subterranean watering and fertilizing of the plant's roots. Specifically, the invention is to be utilized with a ground cover that is to prevent weeds or undesirable plant growth for landscaping purposes around the trees, plants, or shrubs.

Plastic ground covers are widely used in landscaping. One problem with using plastic ground covers around shrubs to prevent weed growth in certain areas is that it greatly diminishes water and nutrient food supplies to those plants that are surrounded by the ground covers. Thus a ground cover not only prevents weed growth, but also prevents water and fertilizer from reaching the roots of the protected plants. It is, however, advantageous to use ground covers in that they definitely inhibit weeds from growing around certain plants in a landscaping scheme, greatly reducing periodic labor in clearing unsightly weeds and crab grass. Other landscaping covering devices, such as wooden chips, rocks, or wood coverings, also are utilized for aesthetic purposes to inhibit undesirable plant growth, such as weeds, around certain specific plants that are placed for the landscaping purpose. Again, these landscaping objects can interfere or impede the proper development of the landscaping plant they surround because of depriving the plant, tree, or bush, of water or nutrients.

Devices have been provided in the prior art going all the way back to January, 1860 in U.S. Pat. No. 73,442, issued to J. C. Fish which shows a tree-feeding tube. U.S. Pat. No. 349,874 issued to Bührer, patented in September, 1886, shows root fertilizers. Devices such as these are not suitable for use in landscaping techniques because they present an unsightly protrusion above the ground. Further, they do not impede weed growth around the insert tube shaft.

The present invention overcomes the problems of the prior art by providing a unitarily-molded dispenser that can be readily used in conjunction with other landscaping devices such that the dispenser does not detract from the aesthetic appearance, that permits the flow of water to the plant roots at all times, provides for time released fertilizing while inhibiting weed growth.

SUMMARY OF THE INVENTION

A subterranean, water and fertilizer dispenser for plants, shrubs, and trees that is useful in landscaping to enhance particular plant growth that is surrounded with weed-inhibiting articles or coverings. When used with a weed-inhibiting ground cover that surrounds the selected landscaping plant or plants, the invention allows for watering and fertilizing and ventilation of the roots of the plant without allowing weed penetration or growth in the covered area. The device, in accordance with the invention, is maintained flush with the ground, effectively unobservable, to fit into any landscaping scheme, so as to not visually detract from the landscape.

A specially designed compartment houses a prepackaged, dissolvable fertilizer disk that provides for prolonged time-release fertilizer application during watering periods.

The invention also includes a cylindrical chamber having a tapered lower pointed end tip, the chamber having a plurality of apertures disposed about its peripheral surface. The upper end of the chamber includes an enlarged, shallow frusto-conically-shaped compartment with raised, internal, radially disposed ribs, that act as a vertical spacer for the fertilizer disk to allow water to flow continuously and unobstructedly while contacting the fertilizer disk.

A disc-shaped, removeable top (also with apertures) fit snuggily over the frusto-conically-shaped compartment, in a plane substantially perpendicular to the longitudinal axis to the cylindrical chamber.

In operation, one or more devices are inserted (at desired distances from a plant, tree, or shrub), vertically into the ground until the top is flush with the ground level, through a ground cover if used. The top may be removed to insert a dissolvable fertilizer disk (pre-shaped to fit in the frusto-conical compartment, if desired. The top is placed back over the upper opening. The device is ready for use. Natural or artificial watering will flow through the apertures in the top, through the frusto-conical compartment, and down into the cylindrical chamber where it is dispensed into the surrounding earth. Water flow contacts the fertilizer disk, dissolving it into small particles or solution that is likewise carried with the water into the surrounding earth, ensuring a timed release, incrementally of the fertilizer over a long period. The cylindrical chamber collects the water and fertilizer mixture, allowing it to seep through the surrounding apertures into the ground.

The shallow, conical compartment extends radially (horizontally) from a hole in the ground cover, effectively preventing weed growth around the dispenser.

It is an object of this invention to provide a dispenser for water and fertilizer that is useful for landscaping.

It is another object of this invention to provide a water dispenser for plant roots that can be used with a ground cover to inhibit weed growth while still providing water to the plants.

And yet still another object of this invention is to provide a useful landscaping tool to enhance plant growth while inhibiting weed and crab grass growth.

In accordance with these and other objects which will be apparent hereinafter, the instant invention will now be described with particular reference to the accompanying drawings.

BRIEF DESCRIPTION OF THE DRAWINGS

FIG. 1 shows a perspective view of the present invention used with a ground cover.

FIG. 2 shows a side elevational view in cross section showing the present invention.

FIG. 3 shows a side elevational view, partially exploded, of the present invention.

FIG. 4 shows a top plan view of the present invention.

FIG. 5 shows a side elevational view of the present invention.

FIG. 6 shows a bottom plan view of the present invention.

PREFERRED EMBODIMENT OF THE INVENTION

Referring now to the drawings and specifically to FIG. 1, a plurality of dispensers 10 are shown, surrounding a representative plant 14 at spaced intervals, to water and fertilize the plant 14. A ground cover 12 surrounds plant 14 to prevent weed growth. The dispensers 10 are inserted through holes in the ground cover.

As shown in FIG. 2, a dispenser 10 is inserted through the plastic ground cover 12 into the earth. The device includes a body 16 having a vertically disposed, cylindrical chamber 16a with a plurality of apertures 20 disposed through its peripheral surface. The lower end of cylindrical chamber 16a includes a pointed tip 16c which aids in penetrating the earth during insertion.

Connected to the upper end (integrally formed therewith) of the cylindrical chamber 16a is a shallow, frustoconically shaped compartment 16b that includes a plurality of radially disposed, raised ribs 16d which vertically support a dissolvable fertilizer disk above the interior wall surface of compartment 16b, allowing water flow into chamber 16a.

Removeably coupled over the top opening of the conically-shaped compartment 16b is a top 18 (FIG. 4) that includes a plurality of holes 18a uniformly distributed thereabout. FIG. 3 shows how the top 18 fits relative to the compartment 16b, in an annular lip around the opening.

FIG. 6 (bottom plan view) shows clearly that the compartment 16b is solid and has no apertures.

An annular overlap 16e extends the radial size of the compartment 16b. The compartment 16b also receives fertilizer disks or other desired nutrients which are placed in the compartment on top of ribs 16d. The space provided by the ribs 16d allows water to flow through the compartment 16b (while contacting the fertilizer) into the cylindrical chamber 16a where it accumulates and flows out through apertures 20 into the surrounding earth.

In operation, the device is preferably used with a ground cover 12, forced through a hole 12a such that the ground cover 12 abutts the lower surface portion of compartment 16b, forming a tight sealed relationship to prevent weed growth or crab grass growth through the hole 12a in the ground cover. Further, the device is pressed into the ground so that the top 18 is level with the surface of the ground. The flow through top 18 also prevents debris, or twigs from collecting in the cylindrical chamber. The top 18 may be easily removed, however, for insertion of fertilizer.

Once installed, the device may be covered with woodchips, rocks, or other landscaping aids that will not hinder its operation.

The instant invention has been shown and described herein in what is considered to be the most practical and the effect of the shallow, solid compartment is to prevent weed growth through the hole 12a placed in the ground cover 12. It is recognized, however, that departures may be made therefrom within the scope of the invention and that obvious modifications will occur to a person skilled in the art.

What I claim is:

1. A device that is useful in landscaping to provide a visually hidden subterranean dispenser for water and fertilizer comprising:

an elongated, hollow, chamber, said chamber having a plurality of apertures disposed through its surface, said chamber having a pointed, end tip disposed at one end, and an opening at the opposite end;

a frusto-conically shaped compartment centrally connected at one end to said chamber opening; and a top mountable over said frusto-conical compartment, said top having a plurality of holes disposed therethrough, whereby said device may be used for watering and fertilizing subterranean areas, and a plurality of raised ribs, disposed within said frusto-conical compartment, for supporting a fertilizer, spaced above the interior surface of the compartment.

2. A device that is useful in landscaping to provide a virtually hidden subterranean dispenser for water and fertilizer comprising:

an elongated, hollow, chamber, said chamber having a plurality of apertures disposed through its surface, said chamber having a pointed, end tip disposed at one end, and an opening at the opposite end;

a frusto-conically shaped compartment centrally connected at one end to said chamber opening; and a top mountable over said frusto-conical compartment, said top having a plurality of holes disposed therethrough, whereby said device may be used for watering and fertilizing subterranean areas;

a ground cover having a hole disposed over the ground to inhibit weed growth, said landscaping device disposed through said hole in said ground cover; and a plurality of raised ribs, disposed within said frusto-conical compartment, for supporting a fertilizer, spaced above the interior surface of the compartment.

* * * * *